(12) United States Patent
Lee

(10) Patent No.: US 8,340,595 B2
(45) Date of Patent: Dec. 25, 2012

(54) SYSTEM AND METHOD FOR CONTROLLING RADIO FREQUENCY TRANSCEIVER AND METHOD THEREOF

(75) Inventor: Sung-Sub Lee, Anyang-si (KR)

(73) Assignee: Seoby Electronics Co., Ltd., Anyang-Si (KR)

( * ) Notice: Subject to any disclaimer, the term of this patent is extended or adjusted under 35 U.S.C. 154(b) by 636 days.

(21) Appl. No.: 11/771,072

(22) Filed: Jun. 29, 2007

(65) Prior Publication Data

US 2008/0113631 A1     May 15, 2008

(30) Foreign Application Priority Data

Nov. 9, 2006    (KR) ........................ 10-2006-0110414

(51) Int. Cl.
    *H04B 1/38*           (2006.01)

(52) U.S. Cl. ...................................... 455/90.3; 455/347

(58) Field of Classification Search .................. 455/90.3
See application file for complete search history.

(56) References Cited

U.S. PATENT DOCUMENTS

| | | | | |
|---|---|---|---|---|
| 4,852,073 | A * | 7/1989 | Shinohara et al. | 369/30.26 |
| 5,086,513 | A * | 2/1992 | Lawrence et al. | 455/186.1 |
| 5,307,053 | A * | 4/1994 | Wills et al. | 340/573.1 |
| 5,375,072 | A * | 12/1994 | Cohen | 702/94 |
| 5,526,368 | A * | 6/1996 | Yun | 714/775 |
| 5,619,257 | A * | 4/1997 | Reele et al. | 348/64 |
| 5,754,258 | A * | 5/1998 | Hanaya et al. | 725/52 |
| 5,793,303 | A * | 8/1998 | Koga | 340/7.56 |
| 6,014,434 | A * | 1/2000 | Kim | 379/157 |
| 6,052,564 | A * | 4/2000 | Toriya | 340/7.35 |
| 6,184,656 | B1 * | 2/2001 | Karunasiri et al. | 320/119 |
| 6,211,852 | B1 * | 4/2001 | Oono et al. | 345/102 |
| 6,265,833 | B1 * | 7/2001 | Kim et al. | 315/169.3 |
| 6,273,904 | B1 * | 8/2001 | Chen et al. | 607/88 |
| 6,278,499 | B1 * | 8/2001 | Darbee et al. | 348/734 |
| 6,278,887 | B1 * | 8/2001 | Son et al. | 455/566 |
| 6,317,614 | B1 * | 11/2001 | Okada | 455/574 |
| 6,411,804 | B1 * | 6/2002 | Isomichi et al. | 455/403 |
| 6,484,019 | B1 * | 11/2002 | Aklian | 455/344 |
| 6,679,971 | B2 * | 1/2004 | Tone et al. | 156/306.6 |
| 6,970,726 | B2 * | 11/2005 | Takayanagi | 455/574 |
| 7,006,802 | B2 * | 2/2006 | Tsui | 455/92 |
| 7,187,936 | B2 * | 3/2007 | Allyn et al. | 455/456.2 |
| 7,206,429 | B1 * | 4/2007 | Vossler | 381/381 |
| 7,295,863 | B2 * | 11/2007 | Takenaka | 455/567 |

(Continued)

FOREIGN PATENT DOCUMENTS

JP        09-321853      12/1997

(Continued)

*Primary Examiner* — Hai V. Nguyen
(74) *Attorney, Agent, or Firm* — Lexyoume IP Meister, PLLC.

(57) ABSTRACT

A system and a method of controlling an RF transceiver are provided. The system includes a key input unit for detecting a key selection, a memory unit storing control data required for operating the RF transceiver and a code table matching with a key value, a liquid crystal display (LCD) for displaying operational information of the RF transceiver, a controller for turning off the LCD that is in an on-state when a data transmitting/receiving request is detected from the key input unit and turning on the LCD when the data transmitting/receiving is completed, and an RF transmitting/receiving unit for modulating a transmitting signal, power-amplifying the transmitting signal, transmitting the amplified signal as an RF signal to an object device through an antenna, and receiving a response signal as an RF signal from the object device.

6 Claims, 3 Drawing Sheets

U.S. PATENT DOCUMENTS

| | | | |
|---|---|---|---|
| 7,301,522 B2 * | 11/2007 | Ko | 345/102 |
| 7,319,889 B2 * | 1/2008 | Goris et al. | 455/574 |
| 7,352,414 B2 * | 4/2008 | Lee | 348/734 |
| 7,353,016 B2 * | 4/2008 | Roundtree et al. | 455/414.1 |
| 7,453,836 B2 * | 11/2008 | Yang | 370/311 |
| 7,489,953 B2 * | 2/2009 | Griffin | 455/575.1 |
| 7,540,010 B2 * | 5/2009 | Hanaya et al. | 725/38 |
| 7,552,402 B2 * | 6/2009 | Bilow | 715/862 |
| 7,580,679 B2 * | 8/2009 | Yokota | 455/67.11 |
| 7,606,598 B2 * | 10/2009 | Kuhl et al. | 455/564 |
| 7,659,676 B2 * | 2/2010 | Hwang | 315/360 |
| 7,731,000 B2 * | 6/2010 | Oh et al. | 187/394 |
| 7,787,886 B2 * | 8/2010 | Markhovsky et al. | 455/456.1 |
| 7,796,183 B2 * | 9/2010 | Hagino | 348/346 |
| 7,822,424 B2 * | 10/2010 | Markhovsky et al. | 455/456.1 |
| 7,865,195 B2 * | 1/2011 | Uemura et al. | 455/456.6 |
| 7,876,358 B2 * | 1/2011 | Yamada et al. | 348/207.2 |
| 8,050,632 B2 * | 11/2011 | Gross | 455/67.11 |
| 8,108,006 B2 * | 1/2012 | Lin et al. | 455/566 |
| 2002/0025808 A1 * | 2/2002 | Acuna | 455/426 |
| 2002/0064264 A1 * | 5/2002 | Lung et al. | 379/142.01 |
| 2002/0081999 A1 * | 6/2002 | Isomichi et al. | 455/412 |
| 2002/0098875 A1 * | 7/2002 | Takenaka | 455/566 |
| 2002/0137479 A1 * | 9/2002 | Tsui | 455/92 |
| 2003/0101452 A1 * | 5/2003 | Hanaya et al. | 725/38 |
| 2003/0148760 A1 * | 8/2003 | Takayanagi | 455/420 |
| 2003/0169450 A1 * | 9/2003 | Kawai | 358/1.15 |
| 2004/0033783 A1 | 2/2004 | Hans et al. | |
| 2004/0095462 A1 * | 5/2004 | Miyata et al. | 348/51 |
| 2004/0142227 A1 * | 7/2004 | Sugai et al. | 429/38 |
| 2004/0187041 A1 * | 9/2004 | Kikugawa | 713/300 |
| 2004/0203499 A1 * | 10/2004 | Kostiainen et al. | 455/90.3 |
| 2004/0220538 A1 * | 11/2004 | Panopoulos | 604/361 |
| 2005/0020279 A1 * | 1/2005 | Markhovsky et al. | 455/456.1 |
| 2005/0136976 A1 * | 6/2005 | Shoemake | 455/557 |
| 2005/0190798 A1 * | 9/2005 | Chau et al. | 370/516 |
| 2005/0266890 A1 * | 12/2005 | Yang | 455/566 |
| 2006/0012476 A1 * | 1/2006 | Markhovsky et al. | 340/539.32 |
| 2006/0020214 A1 * | 1/2006 | Mori et al. | 600/478 |
| 2006/0031013 A1 * | 2/2006 | Okamoto | 701/213 |
| 2006/0044452 A1 * | 3/2006 | Hagino | 348/345 |
| 2006/0046770 A1 * | 3/2006 | Zhu et al. | 455/550.1 |
| 2006/0068917 A1 * | 3/2006 | Snoddy et al. | 463/42 |
| 2006/0135178 A1 * | 6/2006 | Allyn et al. | 455/456.2 |
| 2006/0146045 A1 * | 7/2006 | Lee | 345/211 |
| 2006/0178116 A1 * | 8/2006 | Qi et al. | 455/90.3 |
| 2006/0205445 A1 * | 9/2006 | Sakaniwa et al. | 455/574 |
| 2007/0001841 A1 * | 1/2007 | Anders et al. | 340/539.13 |
| 2007/0028103 A1 * | 2/2007 | Sugi | 713/168 |
| 2007/0055308 A1 * | 3/2007 | Haller et al. | 607/2 |
| 2007/0060110 A1 * | 3/2007 | Sugi | 455/414.1 |
| 2007/0142021 A1 * | 6/2007 | Lee et al. | 455/343.1 |
| 2007/0229250 A1 * | 10/2007 | Recker et al. | 340/531 |
| 2007/0270206 A1 * | 11/2007 | Snoddy et al. | 463/19 |
| 2007/0279711 A1 * | 12/2007 | King et al. | 358/508 |
| 2007/0286386 A1 * | 12/2007 | Denenberg et al. | 379/202.01 |
| 2007/0298850 A1 * | 12/2007 | Miyata et al. | 455/575.3 |
| 2008/0133130 A1 * | 6/2008 | Okamoto | 701/209 |
| 2008/0146281 A1 * | 6/2008 | Cohen et al. | 455/558 |
| 2008/0214273 A1 * | 9/2008 | Snoddy et al. | 463/19 |
| 2008/0224912 A1 * | 9/2008 | Wang | 341/155 |
| 2009/0058751 A1 * | 3/2009 | Suh et al. | 343/795 |

FOREIGN PATENT DOCUMENTS

| | | |
|---|---|---|
| KR | 10-2004-0027151 | 4/2004 |

\* cited by examiner

SYSTEM AND METHOD FOR CONTROLLING RADIO FREQUENCY TRANSCEIVER AND METHOD THEREOF

CROSS-REFERENCE TO RELATED APPLICATION

This application claims priority to and the benefit of Korean Patent Application No. 10-2006-0110414 filed in the Korean Intellectual Property Office on Nov. 9, 2006, the entire contents of which are incorporated herein by reference.

BACKGROUND OF THE INVENTION (a) Field of the Invention

The present invention relates to a radio frequency (RF) transceiver. More particularly, the present invention relates to a system and a method for controlling an RF transceiver that can improve a data transmitting/receiving performance by turning off a liquid crystal display (LCD) during the transmitting/receiving of data when a data transmitting/receiving request to/from an object device is detected.

(b) Description of the Related Art

A small, portable transceiver, such as a remote controller, employs an LCD, which has relatively low power consumption, as a display unit for displaying an operation state. The small, portable transceiver may use a battery, which is a limited energy source, as a power source. In addition, the small, portable transceiver uses an RF communication method in order to obtain a more stable communication area in a local area network.

When the LCD of the RF transceiver operates, radio waves generated by the operation of the LCD interfere with an RF signal that is transmitted and received, thereby attenuating the RF transmitting/receiving signal and converting the RF transmitting/receiving signal into noise.

Therefore, in the conventional RF transceiver, the LCD used as the display unit is physically shielded and an RF transmitting/receiving unit is spaced apart from the LCD as far as possible to prevent the RF transmitting/receiving signal from interfering with the radio waves generated from the LCD and to minimize the generation of noise.

However, the physical structure cannot sufficiently protect the RF transmitting/receiving signal from the radio waves generated by the operation of the LCD, and thus there is still the attenuation of the RF transmitting/receiving signal.

In the conventional transceiver, the transmitting power is maintained to be high to provide transmitting reliability of the RF signal to the object device.

When the transmitting power is maintained to be high, the battery, which is a limited energy source, does not last very long. This causes the deterioration of the reliability of the product.

Further, when a radiofrequency response signal is transmitted from the object device, the response signal interferes with the radio waves from the LCD that is left on, thereby generating noise. Further, by the interference of the response signal with the radio waves from the LCD, the response signal is attenuated, and thus this response signal is not detected as it should. This causes the transceiver to not operate properly.

The above information disclosed in this Background section is only for enhancement of understanding of the background of the invention and therefore it may contain information that does not form the prior art that is already known in this country to a person of ordinary skill in the art.

SUMMARY OF THE INVENTION

Exemplary embodiments of the present invention provide a system and a method for controlling an RF transceiver that can prevent interference and attenuation of an RF transmitting/receiving signal by turning off an LCD that is in an on-state when the data transmitting/receiving request to/from an object device is detected, and by turning on the LCD when it is determined that the data transmitting/receiving is completed, thereby providing an RF signal transmitting/receiving stability and reducing power consumption.

In an exemplary embodiment, a system for controlling an RF transceiver includes a key input unit for detecting a key selection, a memory unit storing control data required for operating the RF transceiver and a code table matching with a key value, an LCD for displaying operational information of the RF transceiver, a controller for turning off the LCD that is in an on-state when a data transmitting/receiving request is detected from the key input unit and turning on the LCD when the data transmitting/receiving is completed, and an RF transmitting/receiving unit for modulating a transmitting signal, power-amplifying the transmitting signal, transmitting the amplified signal as an RF signal to an object device through an antenna, and receiving a response signal as an RF signal from the object device.

In another exemplary embodiment, a method of controlling an RF transceiver includes determining if a data transmitting/receiving request from a key input unit is detected in a standby mode where an LCD maintains an on-state; converting, when the data transmitting/receiving request is detected, data into a code value and turning off the LCD; modulating the converted code value, power-amplifying the modulated code value, and transmitting the amplified code value as an RF signal; determining if the data transmitting/receiving is completed by analyzing a response signal that is transmitted as an RF signal from an object device; and turning on the LCD when it is determined that the data transmitting/receiving is completed.

DESCRIPTION OF REFERENCE NUMERALS INDICATING PRIMARY ELEMENTS IN THE DRAWINGS

Figure 1:
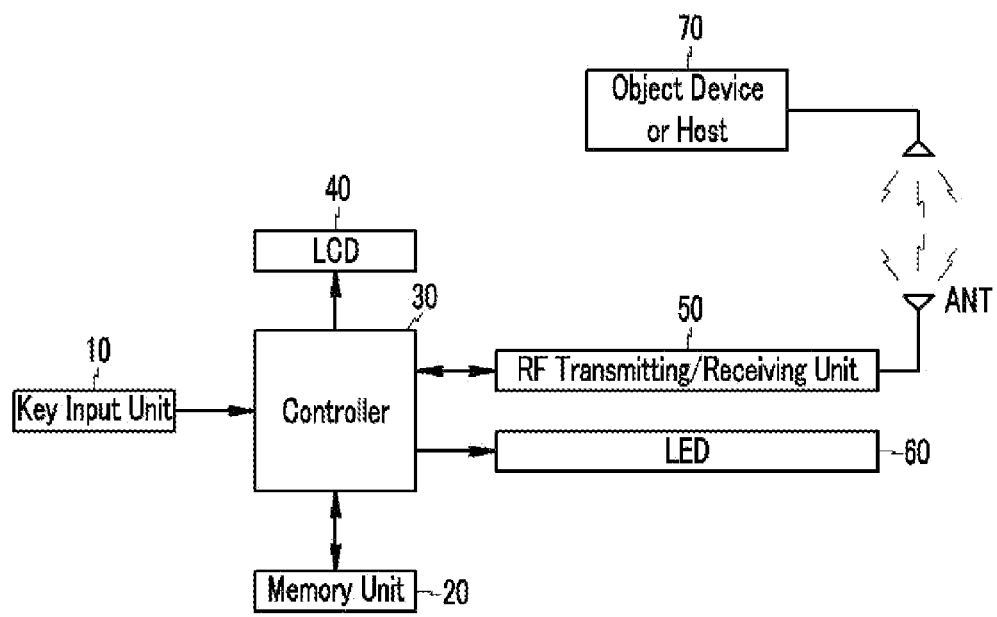
FIG. 1 is a schematic diagram of a system for controlling an RF transceiver according to an exemplary embodiment of the present invention.

10: Key Input Unit 20: Memory Unit
30: Controller 40: LCD
50: RF Transmitting/Receiving Unit 60: LED
70: Object device or Host

DETAILED DESCRIPTION OF THE EMBODIMENTS

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive. Like reference numerals designate like elements throughout the specification.

FIG. 1 is a schematic diagram of a system for controlling an RF transceiver according to an exemplary embodiment of the present invention. Referring to FIG. 1, an RF transceiver control system of an exemplary embodiment of the present invention includes an input unit 10, a memory unit 20, a controller 30, an LCD 40, an RF transmitting/receiving unit 50, and an LED 60.

The key input unit 10 is a key matrix having one or more number keys and one or more function keys for selecting a variety of functions. The key input unit 10 detects a key value selected by a user through a voltage drop and sends a signal corresponding to the key value to the controller 30.

The memory unit 20 stores control data required for operating the RF transceiver and a code table for converting a key value required for making transmissions from the RF transmitting/receiving unit 50.

When the RF transceiver is a multipurpose remote controller, a control code table of a control object device 70 is stored in the memory unit 20.

The controller 30 controls an operation of the RF transceiver. That is, when the data transmitting/receiving request to/from the object device 70 is detected from the key input unit 10, the controller 30 turns off the LCD 40 to prevent the RF signal from interfering with the radio waves generated from the LCD 40 and thus to prevent the RF signal from being attenuated.

When the data transmitting/receiving request to/from the object device 70 is detected from the key input unit 10, the controller 30 turns off the LCD 40 and performs an RF signal transmitting/receiving operation to/from the object device 70 through the RF transmitting/receiving unit 50. When the completion of the data transmitting/receiving operation is detected, the controller 30 turns on the LCD 40.

As described above, the LCD 40 is turned on and off in accordance with a control signal from the controller 30 and displays operational information of the RF transceiver using letters or graphics in accordance with a predetermined method.

The RF transmitting/receiving unit 50 modulates and amplifies the transmission signal applied from the controller 30 and transmits the same as the RF signal to the object device 70 through an antenna ANT. The RF transmitting/receiving unit receives RF signal data and a response signal indicating that the received signal is complete from the object device 70 through the antenna ANT. The RF transmitting/receiving unit also modulates and amplifies the received signal. Then, the RF transmitting/receiving unit 50 transmits the amplified signal to the controller 30.

The LED 60 displays the operation state of the RF transceiver when the LCD 40 is turned off in accordance with the control signal of the controller 30.

Figure 2:
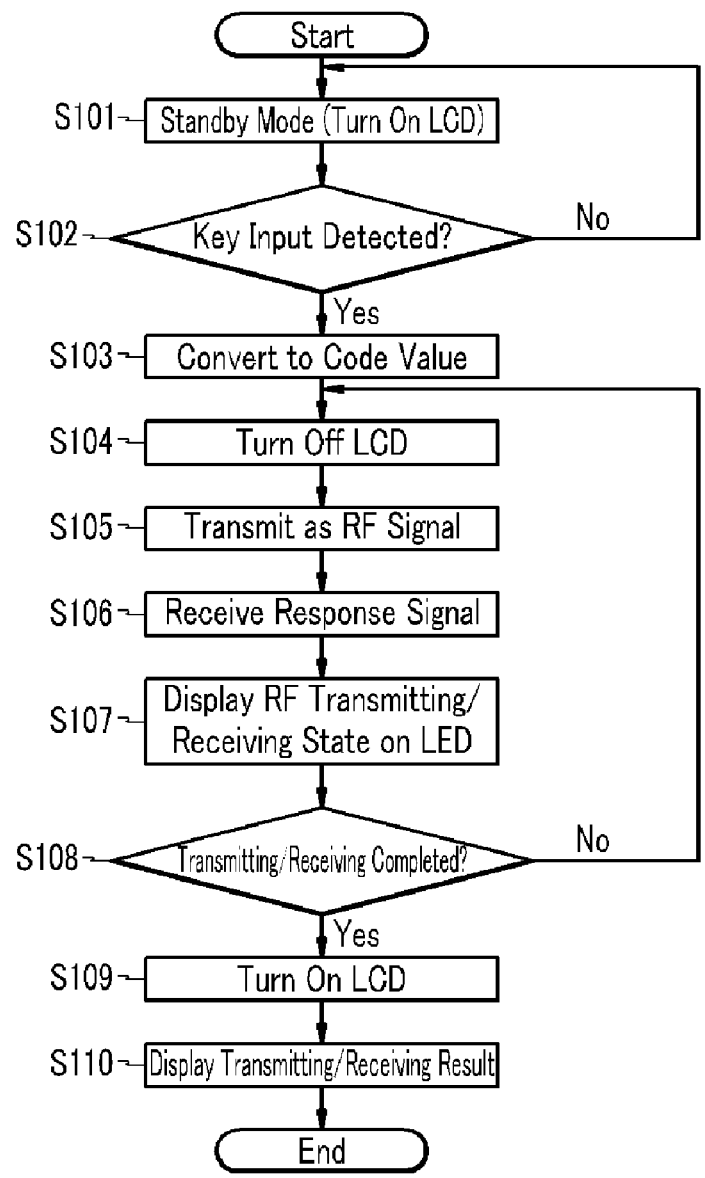
FIG. 2 is a flowchart illustrating a method for controlling an RF transceiver according to an exemplary embodiment of the present invention.

The following will describe a method for controlling an on/off operation of the LCD during the RF signal transmitting/receiving with reference to FIG. 2.

The controller 30 maintains an on-state of the LCD 40 in a standby mode, and it is determined if a key input is detected from the key input unit 10 in the standby mode (S101, S102).

At this point, when the key input is detected in accordance with a contact point selection of the user, it is determined that there is a data transmitting/receiving request to/from the object device 70 and a detected key value is stored in a temporary memory (not shown).

The detected key value is applied to the code table stored in the memory unit 20 and is converted into a code value that can match with the key value (S103).

Next, the LCD 40 that is in an on-state is controlled to be turned off to prevent the RF transmitting/receiving signal from interfering with the radio waves generated from the LCD 40 that is operating, and thus prevents the attenuation of the RF transmitting/receiving signal.

When the LCD 40 is controlled to be turned off, the code value matching with the key value is applied to the RF transmitting/receiving unit 50.

Therefore, the RF transmitting/receiving unit 50 modulates a transmitting code value applied from the controller 30, power-amplifies the same up to a predetermined level, converts the amplified value into an RF signal, and transmits the RF signal to the object device 70 (S105).

After the above, when there is a response from the object device 70 with respect to the RF signal transmission, the RF transmitting/receiving unit 50 receives an RF response signal (S106).

Then, the RF transmitting/receiving unit 50 modulates the RF response signal transmitted through the antenna ANT, gain-amplifies the RF response signal, and transmits the amplified signal to the controller 30.

In a state where the LCD 40 is turned off as described above, the RF signal transmitting/receiving state is displayed through the LED 60 by the control of the controller 30 (S107).

Next, it is determined if the RF signal transmitting/receiving is completed by analyzing the response signal transmitted from the object device 70 (S108).

The completion of the RF signal transmitting/receiving is determined by analyzing information contained in the response signal provided by the object device 70.

In S108, if it is determined that the RF signal transmitting/receiving is completed, the LCD 40 that is in the off-state is turned on (S109) and the RF signal transmitting/receiving result is displayed by numbers, letters, and/or graphics (S110).

In the previous description, the completion of the RF signal transmitting/receiving is determined by analyzing information contained in the response signal transmitted from the object device 70.

However, the RF transceiver may be designed not to communicate with the object device 70 in a two-way manner but to communicate with the object device 70 in a one-way manner. At this point, when there is no code transmission for a predetermined time after a code corresponding to a key value input from the key input unit 10 is transmitted as the RF signal, it is determined that the RF signal transmission is completed and thus the LCD 40 is turned on.

A case where one or more RF transceivers transmit or receive an RF signal to or from one host 70 will be described by way of example.

The host 70 always maintains a standby state. In the RF transceiver of FIG. 1, the memory unit 20 stores a device identification (ID) of the RF transceiver.

When a user requests data transmitting/receiving to/from the host 70, the controller 30 turns off the LCD 40 that is in the on-state.

As the LCD 40 is turned off, no radio waves are generated. Therefore, the interference of the RF signal with the radio waves can be prevented and thus the attenuation of the RF signal can be prevented.

Next, the device ID of the corresponding transceiver is added to a code value matching with a key value input from the key input unit and the code value is transmitted to the RF transmitting/receiving unit 50.

At this point, the RF transmitting/receiving unit 50 modules the code value containing the device ID, power-amplifies the code value, transmits the code value as the RF signal to the host 70 through the antenna ANT, and receives a response signal containing the device ID from the host 70.

The RF transmitting/receiving unit 50 analyzes the device ID and determines if the device ID corresponds to the transceiver. When the device ID corresponds to the transceiver, it is determined that the data transmission is completed and the LCD 40 is turned on to display the transmitting/receiving information to/from the host 70.

Figure 3:
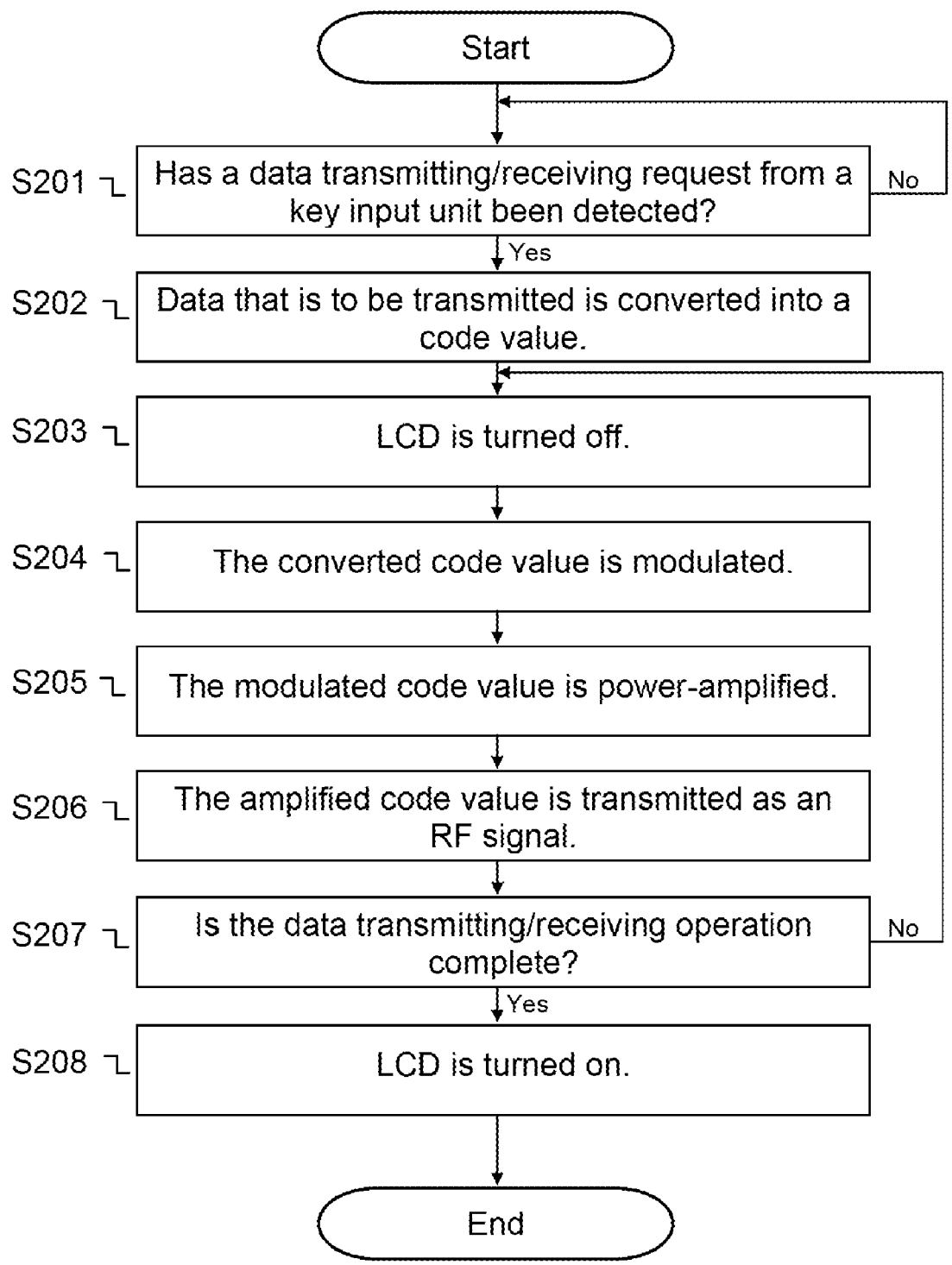
FIG. 3 is a flowchart illustrating a method for controlling an RF transceiver according to an alternative embodiment.

In an alternative embodiment, illustrated in FIG. 3, a method of controlling an RF transceiver includes determining if a data transmitting/receiving request from a key input unit 10 is detected in a standby mode (S201). When a data transmitting/receiving request is detected, data that is to be transmitted is converted into a code value (S202). The LCD 40 is then turned off (S203). The converted code value is then modulated (S204). The modulated code value is then power-amplified (S205). The amplified code value is then transmitted as an RF signal (S206). It is then determined if the data transmitting/receiving operation is completed by analyzing a response signal that is transmitted as an RF signal from an object device 70 (S207). The LCD 40 is turned on when it is determined that the data transmitting/receiving operation is completed (S208).

As described above, according to the RF transceiver according to the present invention, when the data transmitting/receiving request to/from the object device 70 is detected, the LCD that is a bad influence on the data transmitting/receiving is turned off, after which, when the RF signal transmitting/receiving is completed, the LCD is turned on, thereby providing data transmitting/receiving stability and reliability.

Further, since there is no attenuation and interference of the RF signal, the signal transmitting/receiving can be realized with relatively low power and the quality of the product increases.

In addition, to attenuate the noise of conventional radio units, each of the display units should be shielded. In this case, the product cost increases. However, in the present invention, since the RF signal can be stably transmitted and received without shielding the LCD, the product cost can be reduced.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method comprising:
   providing a portable electronic device having a keypad, a memory, a liquid crystal display, a radiofrequency transceiver, a radiofrequency antenna and a light emitting diode;
   detecting a key value input from the keypad as being a sole condition;
   in response to detecting the key value, (a) converting the key value to a code value based on a code table stored in the memory and (b) switching the liquid crystal display to an off state;
   modulating the code value to generate a modulated code value;
   providing the modulated code value to the radiofrequency transceiver;
   amplifying the modulated code value to generate an amplified code value;
   converting the amplified code value to a radiofrequency signal;
   transmitting the radiofrequency signal from the radiofrequency antenna;
   determining whether transmission of the radiofrequency signal is complete; and
   switching the liquid crystal display to an on state after transmission of the radiofrequency signal is complete;
   wherein while the liquid crystal display is in the off state, a status of the radiofrequency transceiver is displayed using the light emitting diode.

2. The method of claim 1, wherein determining whether transmission of the radiofrequency signal is complete further comprises: using the radiofrequency antenna to receive a response signal that is made in response to the transmission of the radiofrequency signal; and analyzing the response signal.

3. The method of claim 1, wherein determining whether transmission of the radiofrequency signal is complete further comprises, after the radiofrequency signal is transmitted from the radiofrequency antenna, detecting a predetermined period of time wherein no further signals are transmitted from the radiofrequency antenna.

4. A method comprising:
   providing a portable electronic device having a keypad, a memory, a liquid crystal display, a radiofrequency transceiver, a radiofrequency antenna and a light emitting diode;
   detecting a key value input from the keypad as being a sole condition;
   in response to detecting the key value, (a) converting the key value to a code value based on a code table stored in the memory and (b) switching the liquid crystal display to an off state;
   providing the code value to the radiofrequency transceiver;
   amplifying the code value to generate an amplified code value;
   converting the amplified code value to a radiofrequency signal;
   transmitting the radiofrequency signal from the radiofrequency antenna;
   determining whether transmission of the radiofrequency signal is complete; and
   switching the liquid crystal display to an on state after transmission of the radiofrequency signal is complete;
   wherein while the liquid crystal display is in the off state, a status of the radiofrequency transceiver is displayed using the light emitting diode.

5. The method of claim 4, wherein determining whether transmission of the radiofrequency signal is complete further comprises: using the radiofrequency antenna to receive a response signal that is made in response to the transmission of the radiofrequency signal; and analyzing the response signal.

6. The method of claim 4, wherein determining whether transmission of the radiofrequency signal is complete further comprises, after the radiofrequency signal is transmitted from the radiofrequency antenna, detecting a predetermined period of time wherein no further signals are transmitted from the radiofrequency antenna.

* * * * *